US006245169B1

(12) United States Patent
Young

(10) Patent No.: US 6,245,169 B1
(45) Date of Patent: Jun. 12, 2001

(54) METHOD OF REPAIRING VINYL COVERS ON VEHICLE SEATS

(75) Inventor: Douglas A. Young, Huntsville, TX (US)

(73) Assignee: National Guaranteed Vinyl, Huntsville, TX (US)

( * ) Notice: Subject to any disclaimer, the term of this patent is extended or adjusted under 35 U.S.C. 154(b) by 0 days.

(21) Appl. No.: 09/151,958

(22) Filed: Sep. 11, 1998

(51) Int. Cl.[7] .................................................. B32B 35/00
(52) U.S. Cl. ................................................ 156/82; 156/94
(58) Field of Search .............................. 156/94, 98, 497; 428/63; 29/402.09; 427/140

(56) References Cited

U.S. PATENT DOCUMENTS

| 2,855,338 | * | 10/1958 | Mulkey | 156/94 |
| 3,804,685 | * | 4/1974 | Jacoby et al. | 156/98 |
| 3,887,413 | * | 6/1975 | Speer | 156/94 |
| 3,975,558 | * | 8/1976 | Speer | 156/94 |
| 4,013,495 | * | 3/1977 | Golumbic | 156/98 |
| 4,260,139 | * | 4/1981 | Speer | 156/98 |
| 4,283,240 | * | 8/1981 | Speer | 156/98 |
| 4,358,495 | * | 11/1982 | Parker | 156/94 |
| 4,419,162 | * | 12/1983 | Fischer | 156/94 |
| 4,702,956 | * | 10/1987 | Wilson et al. | 428/251 |

* cited by examiner

Primary Examiner—Jeff H. Aftergut
Assistant Examiner—Gladys Piazza
(74) Attorney, Agent, or Firm—Browning Bushman P.C.

(57) ABSTRACT

A method of repairing an outer vinyl seat cover (14) having a tear (20) therein by spreading a liquid vinyl (21) over the outer surface of the vinyl seat cover (14) adjacent the cut (20) and into the area formed by the cut, and then applying a woven mesh patch (22) larger than the tear (20) onto the liquid vinyl (21) on the outer surface of the vinyl cover (14) over the tear (20). The mesh patch (22) and liquid vinyl (21) are heated by a propane torch to a temperature over at least about 1000 F. and preferably 1400 F. for curing. Next, a silicone graining pad (24) is pressed down against the patched area while the cured vinyl is hot. Additional layers of liquid vinyl are added to the patched area and cured to a temperature over about 1000 F. until the desired vinyl thickness is obtained. Then the patched area is spray painted while the patched area is at a temperature over about 500 F. to provide a color to the patched area similar to the color of the outer vinyl seat cover (14).

1 Claim, 1 Drawing Sheet

METHOD OF REPAIRING VINYL COVERS ON VEHICLE SEATS

BACKGROUND OF THE INVENTION

1. Field of the Invention

This invention relates to a method of repairing vinyl covers on vehicle seats, and more particularly to a method for patching tears, cuts, and abrasions in the outer vinyl cover of vehicle seats including the lower seat portion and the upper back seat portion.

2. Background of the Invention

Heretofore, tears or abrasions on vinyl seat covers have been repaired by using a patch material which is inserted beneath the cut or tear against the lower or inside surface of the vinyl cover. Liquid vinyl has been applied over the patch material and adjacent cover and heated to about 800 F. (800 degrees Fahrenheit) for curing of the liquid vinyl. All temperatures set forth hereinafter including the claims are expressed in numerical value or numbers with the letter F. thereafter to indicate degrees Fahrenheit. A graining pad is then pressed manually against the patch to smooth out the patched area and minimize any high spots or air pockets. Additional layers of liquid vinyl are applied and heated to about 800 F. for curing to provide the desired patch thickness over the cut area. The graining pad is applied after each layer. Then the patched area is spray painted while the patched area is hot with a paint having a color similar to the outer surface of the vinyl cover.

Oftentimes, an inner fabric layer is secured to the inner surface of the vinyl cover and may be of a substantial thickness. As a result, when the patch is inserted within the tear or cut against the backing layer of the vinyl cover, the patch is against the inner surface of the inner fabric layer secured to the outer vinyl cover and a smooth patch is oftentimes not obtained except possible with a large number of layers of liquid vinyl material applied to the patched area. Also, abrasions not involving a cut or tear in the outer vinyl cover have been difficult to repair heretofore.

It is an object of this invention to provide a method for patching a tear or cut in an outer vinyl cover for a seat in which the patch is applied to the outer surface of the vinyl cover over the cut or tear.

SUMMARY OF THE INVENTION

The present invention is directed particularly to a method of patching a tear, cut or abrasion in an outer vinyl cover of a vehicle seat by applying the patch onto the outer surface of the vinyl cover over the tear or abrasion on a lower seat portion or an upper back seat portion of the vehicle seat. The method is particularly adapted for use on vinyl seat covers for seats on school buses.

Liquid vinyl is first applied with a suitable spatula or putty knife over the cut area including the adjacent outer vinyl cover. Then, the patch material is placed against the outer surface of the vinyl cover after the liquid vinyl has been applied. Next, the liquid vinyl and patch are heated to a temperature over 1000 F. and preferably about 1400 F. for curing the liquid vinyl material. A propane heat gun or torch has been found to be effective in heating the patched area to a temperature of 1400F–1500 F. in a minimum of time. An inner foam material such as a polyurethane foam material is normally beneath the outer vinyl cover and may be replaced prior to application of the patch material and liquid vinyl if it has been torn away.

The patch comprises a mesh material which is fire resistant and is a woven fibrous material having a thickness between about 5 to 10 mils and preferably about 7 mils in thickness. After applying the patch and heating the patch and liquid vinyl, a graining pad is pressed manually against the patched area to provide a desired texture to the patch area and to smooth the patched area and remove air pockets. The vinyl material permeates the relatively thin mesh layer.

To provide additional thickness and smoothness, additional layers of liquid vinyl are applied over the patched area and heated for curing the liquid vinyl over the mesh patch. Normally, at least two additional layers of liquid vinyl are applied and cured with the graining pad pressed manually against each layer while hot. After curing of the last vinyl layer, a suitable spray paint is applied after the vinyl is cured but while the repair remains hot.

Other objects, features, and advantages of the invention will be apparent from the following specification and drawings.

DESCRIPTION OF THE INVENTION

Figure 1:
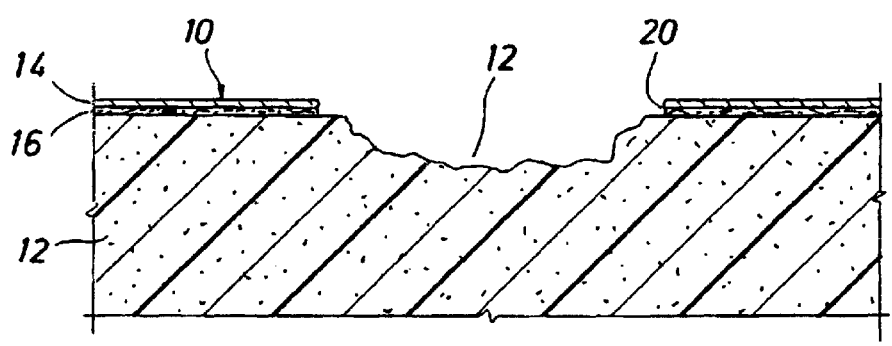
FIG. 1 is a sectional view of a portion of a seat having a vinyl outer cover over an inner foam material with a tear thereon having a portion of the outer vinyl cover and inner foam material removed.
Figure 2:
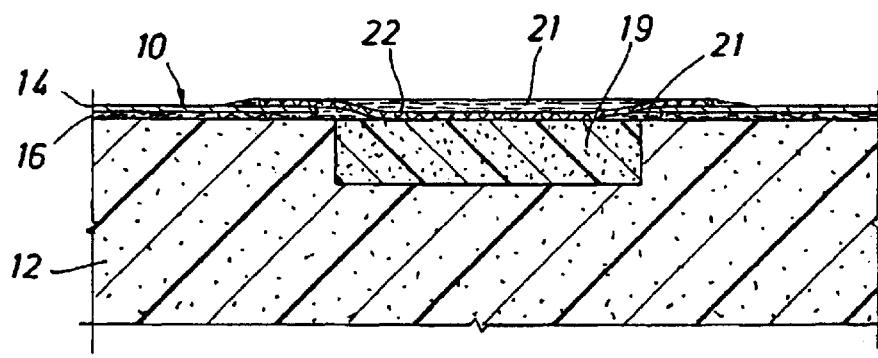
FIG. 2 is a sectional view of the patched area after a base layer of liquid vinyl and mesh patch have been applied to the outer surface of the vinyl cover and cured.
Figure 3:
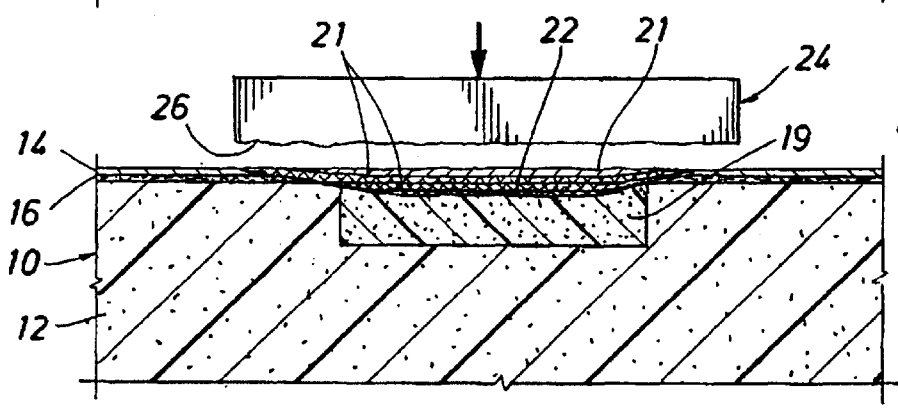
FIG. 3 is a sectional view similar to FIG. 2 taken along line 3—3 of FIG. 4 but illustrating the completed patched area with additional layers of cured vinyl and a graining pad over the patched area adapted for manual pressing against the patched area.
Figure 4:
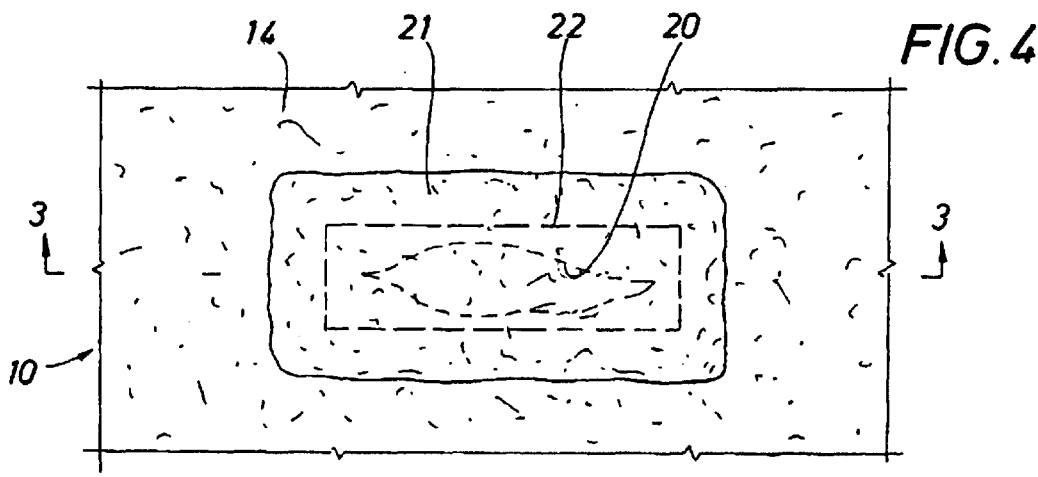
FIG. 4 is a plan view of the completed patched area shown in FIG. 3.

Vinyl seats such as provided on school buses or the like have a number of seats for the students. Each seat usually has a generally horizontal lower seat portion and a generally vertical back rest portion. An outer vinyl cover is normally provided over each seat portion and the vinyl cover is subjected to wear and various acts of vandalism resulting in tears or cuts in the outer vinyl cover including damage to the inner foam material.

Referring to the drawings, the seat portion is shown generally at 10 comprising an inner foam cushion 12 and an outer vinyl cover 14 having an inner nylon backing layer 16 secured thereto. Vinyl cover 14 including backing layer 16 is positioned over foam cushion 12. A tear or cut in the vinyl cover 14 and backing layer 16 is shown at 20 and a portion of the vinyl cover 14 and layer 16 has been removed at the tear. The tear, for example, is about two inches in length and the width of the removed vinyl cover section at the tear 20 has a maximum width of about ½ inch, for example. A portion of the foam material 12 has also been torn away at tear 20.

A vinyl repair kit is preferably provided with all of the required elements for repair of cut 20. The repair kit includes the following items or elements: (1) liquid vinyl, (2) fire resistant mesh patch, (3) spatula, (4) propane heat gun, (5) silicone graining pad, (6) thinner for cleaning, (7) scissors, (8) upholstery pins, and (9) aerosol spray paint.

For preparation of the repair area, the surface of outer vinyl cover 14 adjacent tear or cut 20 is cleaned with a suitable thinner material. If any foam material 12 is missing beneath cut 20, the foam material as shown at 19 is added.

In many instances, the foam material is not damaged and no repair of the foam material is required. A fire resistant mesh patch 22 is cut from a roll of the mesh patch material which preferably comprises a fire resistant woven material having a thickness between about five to ten mils and preferable about seven mils in thickness. A suitable woven material may be obtained from Sandel International, Inc., Amsterdam, N.Y.

The liquid vinyl material shown at 21 is a plastisol material in a paste-like composition and may be applied by a spatula or putty knife. A suitable liquid vinyl material may be obtained from Dennis Chemical Co., St. Louis, Mo.

A silicone graining pad shown at 24 is of a thickness of about ¼ inch and is of a size greater than the patched area for pressing down against the patched area after heating of the patched area. The silicone graining pad 24 has an inner texturized surface 26 similar to the texture of the outer vinyl cover 14. A propane torch provides relatively fast curing of the vinyl material and may heat the vinyl material to a temperature as high as about 1800 F. in a minimum time. The preferred heating of the vinyl material for curing is around 1400 F. to 1500 F. with at least around 1000 F. for adequate curing of the repaired area.

Repair Steps

First, after cleaning and the addition of any foam material 19, a relatively thin, smooth base layer of liquid vinyl 21 is smeared over the damaged area with a putty knife including any exposed foam material 12 and the outer vinyl cover 24 adjacent tear 20. Next, a fire retardant mesh patch 22 which has been cut from a roll of the mesh material of a size to cover the cut area and slightly larger than the cut area is placed over the base layer of liquid vinyl 21 and tear 20. Then, a propane torch heats the base layer of liquid vinyl 21 and mesh material 22 over the cut area or tear 20 to a temperature of about 1400 F. for about two seconds. Then, the silicone graining pad 24 with lower texturized surface 26 is pressed manually down onto the heated patched area within one to two seconds after heating of the area and held down about three seconds for eliminating or minimizing air pockets and uneven surfaces. The liquid vinyl material permeates the mesh patch 22 and is cured.

After curing of the base layer of liquid vinyl 21, it is necessary to apply at least two additional layers of the liquid vinyl over the patched area after the initial application in order to obtain a suitable repair. The additional layers include spreading the layer of liquid vinyl over the base vinyl layer and patch with the spatula, then heating the liquid vinyl with the propane heat torch or gun to a temperature over 1000 F. and preferably about 1400 F., and then pressing the graining pad 24 against the patched area while the patched area is still hot. When the last layer of liquid vinyl is applied, graining pad 24 is pressed against the patched area at least about five seconds with a firm manual pressure for forming the texturized surface on the patched area.

After application of the last layer of liquid vinyl 21, a suitable aerosol paint which is similar in color to the outer surface of the outer vinyl cover 10 is sprayed onto the patched area while the patched area is preferably at a temperature of about 800 F–900 F. The temperature of the patched area should be at least 500 F. for an effective application of paint.

A minimum number of liquid vinyl layers 21 of about three are required. The maximum number of vinyl layers would not exceed about six layers with the average number of layers being about four. Silicone graining pad 24 is pressed downwardly within one to two seconds after the patched area has been heated and is held down about three seconds. The spray paint is a high heat vinyl paint and may be obtained in a variety of colors corresponding to the colors of various outer vinyl covers 10 on seats. The liquid vinyl material is of a type utilized for forming polyvinylchloride (PVC) pipe and has a sufficient viscosity so that it does not flow substantially after being applied.

From the above, it is apparent that a method for repairing a cut or tear in an outer vinyl cover of a seat has been provided in which the patch includes a woven mesh material that is positioned over the cut and outer vinyl cover after a base layer of liquid vinyl has been applied to the outer surface of the vinyl cover about the cut. The method further utilizes the high heat obtained from a propane heat torch sufficient to heat the liquid vinyl to a temperature of about 1400 F. for curing. Best results are obtained if the temperature is at least about 1300 F. Such a repair method has been found to be very effective in repairing vinyl seat covers on school buses.

While a preferred embodiment of the present invention has been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. A method of repairing a tear in an outer vinyl seat cover over an inner foam material of a seat comprising the following steps:

cleaning the outer surface of the vinyl seat cover adjacent the tear;

spreading a base layer of liquid vinyl of a plastisol material in a pasty composition over the outer surface of the vinyl seat cover adjacent the tear;

cutting a patch from a roll of a fire resistant woven fibrous mesh material;

applying the fire resistant woven fibrous mesh patch having a thickness between about five mils and ten mils over the tear onto the base layer of liquid vinyl on the outer surface of the vinyl seat cover;

providing a propane torch;

heating the liquid vinyl and patch with said propane torch to a temperature over 1300 F. for two seconds;

then manually applying a silicone graining pad over the heated patched area and pressing the silicone graining pad against the vinyl seat cover for smoothing the patched area with said liquid vinyl permeating said mesh patch;

then applying at least two additional layers of liquid vinyl onto the patched area and heating the liquid vinyl over 1300 F. for two seconds with a propane torch for curing of the liquid vinyl;

then manually reapplying the silicone graining pad over the heated patched area after the application of each layer of liquid vinyl and within two seconds of heating of the patched area; and spraying a vinyl paint to the patched area after application of the last layer of the liquid vinyl and while the temperature of the patched area is between 800 F. and 900 F.

* * * * *